United States Patent
Nerone

(10) Patent No.: US 6,794,829 B2
(45) Date of Patent: Sep. 21, 2004

(54) METHOD AND APPARATUS FOR A PROTECTIVE BALLAST CIRCUIT

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/247,795

(22) Filed: Sep. 19, 2002

(65) Prior Publication Data

US 2003/0098658 A1 May 29, 2003

Related U.S. Application Data

(60) Provisional application No. 60/323,447, filed on Sep. 19, 2001.

(51) Int. Cl.$^7$ ............................................... H05B 41/16
(52) U.S. Cl. .................. 315/247; 315/209 R; 315/224; 315/287; 315/291
(58) Field of Search .......................... 315/247, 209 R, 315/224, 287, 291, 246, 274, 323, 324, 307, 225, 184, 200 R, 312

(56) References Cited

U.S. PATENT DOCUMENTS

| 4,392,087 | A | | 7/1983 | Zansky | 315/219 |
|---|---|---|---|---|---|
| 5,179,326 | A | | 1/1993 | Nilssen | 315/106 |
| 6,160,358 | A | * | 12/2000 | Moisin | 315/291 |
| 6,194,842 | B1 | * | 2/2001 | Canova | 315/225 |
| 6,246,182 | B1 | * | 6/2001 | Yamasaki et al. | 315/209 R |
| 6,320,329 | B1 | * | 11/2001 | Wacyk | 315/291 |
| 6,424,098 | B1 | * | 7/2002 | Beland et al. | 315/224 |
| 6,545,432 | B2 | * | 4/2003 | Konopka | 315/291 |

* cited by examiner

*Primary Examiner*—Tuyet T. Vo
(74) *Attorney, Agent, or Firm*—Fay, Sharpe, Fagan, Minnich & McKee, LLP

(57) ABSTRACT

A plurality of lighting ballasts (12, 14, 16) draw power from a single DC bus signal. A power factor correction circuit (10) rectifies and smoothes AC power to produce the DC bus signal. In order to prevent damage to the ballast (12) when a lamp (18) dies or is removed, the ballast (12) includes an AC switch that senses damaging conditions and responds by changing a resonant frequency of the ballast (12). The AC switch operates in 2–3 second cycles. While it is operative, it shunts current away from inductors (38, 40) of the ballast (12) causing a resonant frequency of the ballast (12) to change. At the end of the cycle, the switch turns off, but if a load fault is still present in the ballast (12) it activates again. Preferably, the AC switch has a response time of approximately 500 $\mu$s.

17 Claims, 3 Drawing Sheets

METHOD AND APPARATUS FOR A PROTECTIVE BALLAST CIRCUIT

This application claims benefit of 60/323,447 filed Sep. 19, 2001.

BACKGROUND OF THE INVENTION

The present invention relates to the artificial illumination arts. It finds particular application in protecting lamp ballasts from open circuit load faults and will be described with particular reference thereto. It is to be appreciated, however, that the present invention is also applicable to protecting vital components of other circuits from voltage and current surges, and is not limited to the aforementioned application.

Often, it is desirable to operate fluorescent lamps independently of each other. In many existing systems, if one lamp fails, others will also cease to function. To aid in the re-lamping process, it is desirable to have all functioning lamps operating, so that a repairman can easily discern which lamps need to be replaced. Also, it is easier for the repairman to work if he has light from adjacent lamps to aid him.

When a lamp fails, or is outright removed from the circuit while the ballast is in operation, open circuit voltages can become so high as to damage sensitive circuit components, rendering the ballast useless for further lighting applications. However in order to replace the lamp while other lamps are in operation, it is necessary to remove the lamp while power is being supplied to the ballast.

Often, ballast circuits include a plurality of transistors, such as bi-polar junction transistors, (BJTs), for switching purposes. In these applications, transistors may be stressed beyond their rated values. In existing ballasts, an open circuit load fault causes greatly increased current flow. With such current flowing through the BJTs, the maximum rated current may be exceeded, resulting in failure of the transistors.

BRIEF DESCRIPTION OF THE INVENTION

In accordance with one aspect of the present invention, a lighting system powered by an alternating current source is provided. A power factor correction circuit creates a direct current bus, which is used to power a lamp ballast. The ballast includes an alternating current switch that protects circuit components when the lamp is removed or fails to ignite.

In accordance with another aspect of the present invention, a method of protecting a DC lighting ballast from high open circuit voltages is provided. In response to a load being removed from the circuit, an alternating current switch is activated that raises the operating frequency of the ballast, thereby lowering voltage and current flow through the circuit.

In accordance with another aspect of the present invention, an alternating current switch for use in conjunction with a lamp ballast is provided. First and second field effect transistors draw current away from the phase shifting inductor of the ballast. An inductive tap provides a signal to control the gates of the transistors. First and second charge pumps store charge from the inductive tap.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
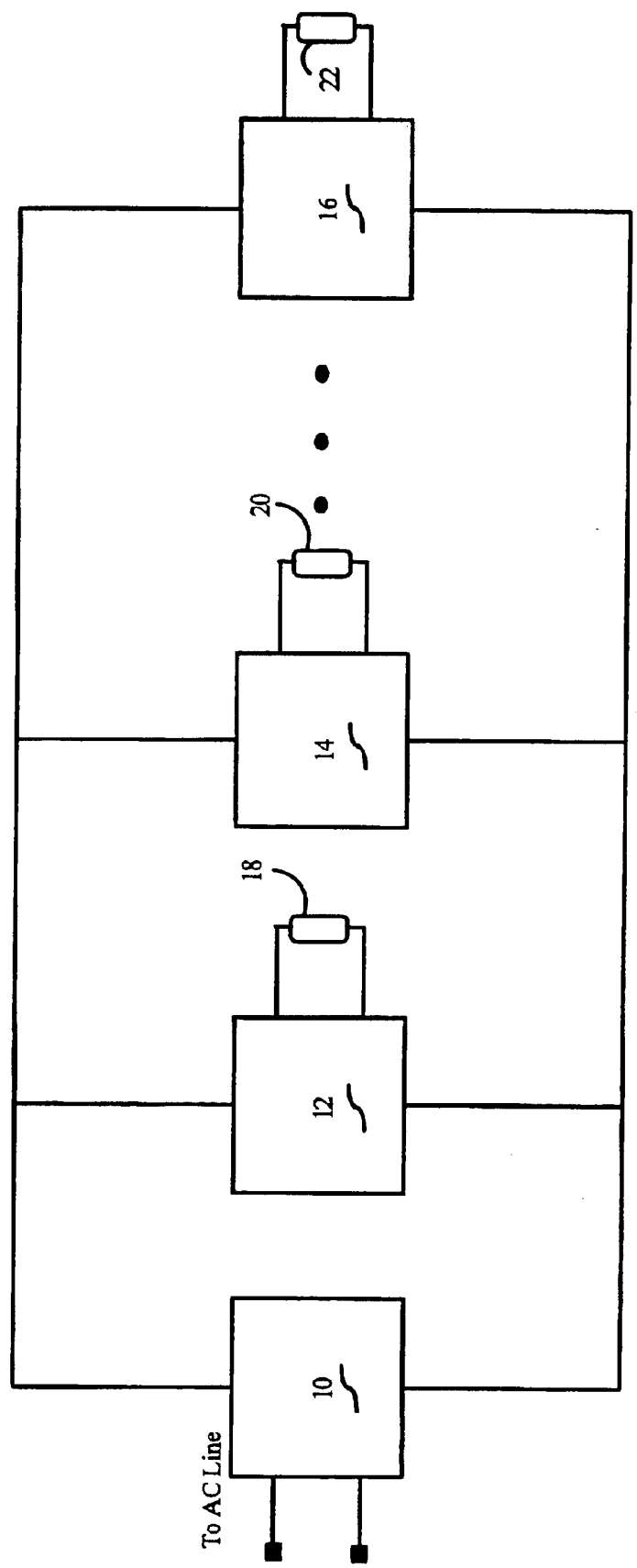
FIG. 1 is a diagrammatic illustration of a lighting system including multiple lamp ballasts operating off of a direct current bus, in accordance with an embodiment of the present invention.

With reference to FIG. 1, a power factor correction circuit 10 is connected to an alternating current (AC) power source. The power factor correction circuit 10 includes rectifying and smoothing components, as are well known in the art, to convert the AC signal into a direct current (DC) bus signal. A plurality of lamp ballasts 12, 14, 16 are connected in parallel to the power factor correction circuit. It is to be understood that any number of ballasts may draw power from the DC bus, to a capacity of the AC source. Associated with each ballast is a lamp 18, 20, 22. In the preferred embodiment, the ballasts 12, 14, 16 are independently operable. Though they draw power from the same source, any combination of lamps 18, 20, 22 may be lit at any given time. Preferred control methods include wall switch controls, RF remote control, audible/voice recognition control, and others.

Preferably, each ballast operates at a distinct resonance frequency. That is, there is a single frequency or small range of frequencies at which the ballast circuit will light the lamp. Some ballasts are selected to have broad ranges of operating frequencies, and some have relatively narrow ranges. Knowing the respective frequency ranges and the overlap among the ballasts allows a frequency to be selected that lights the desired lamps.

Figure 2:
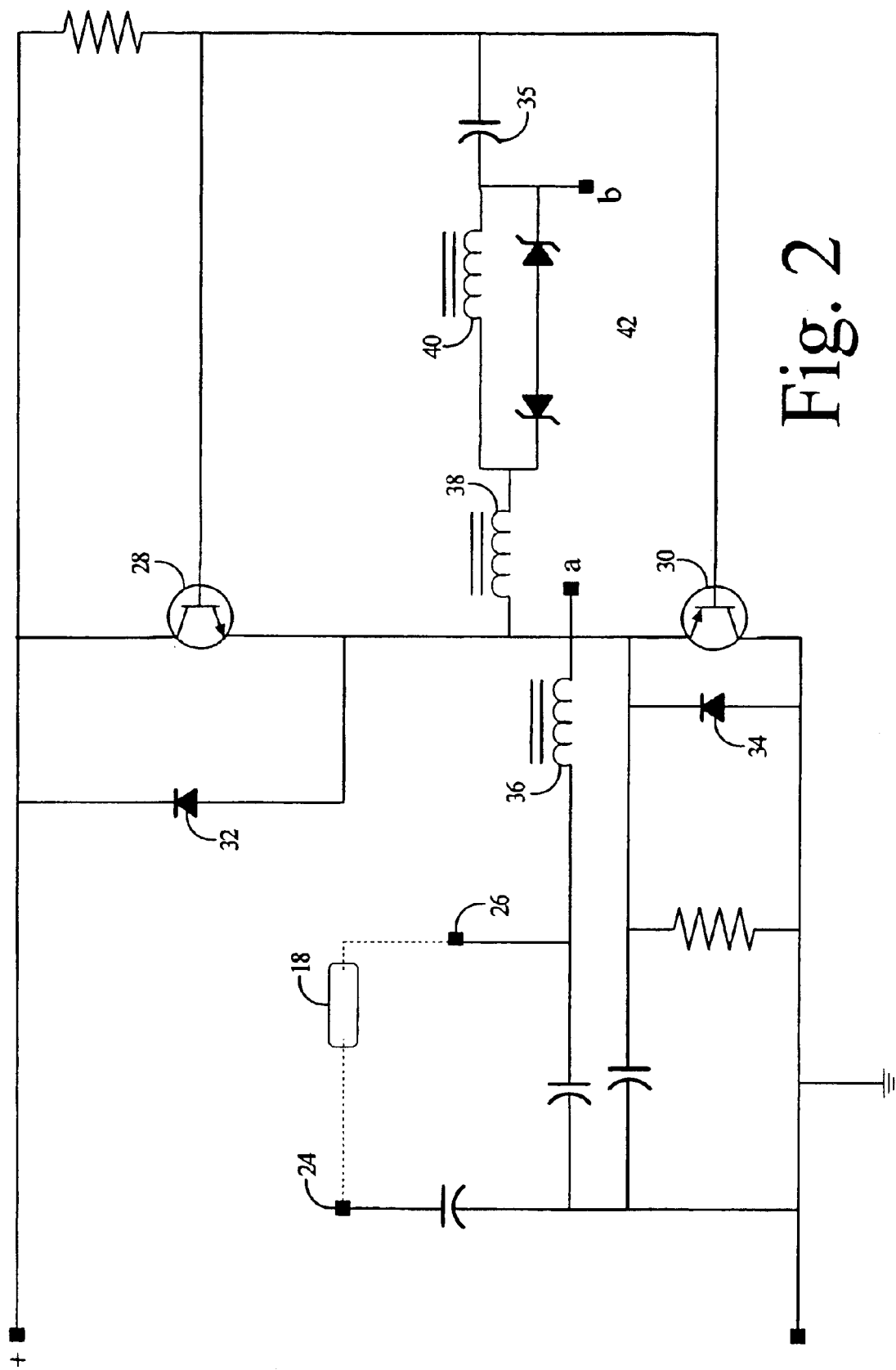
FIG. 2 is a circuit diagram of a lamp ballast circuit, in accordance with an embodiment of the present invention.

With reference to FIG. 2, in a preferred embodiment of the ballast circuit, the lamp 18 is connected between external contacts 24, 26. Should the lamp 18 be removed from the circuit, or fail to ignite, the area between points 24 and 26 looks open to the rest of the circuit. With no load lamp present in the ballast, the remainder of the circuit is overdriven, which results in increased current flow to bi-polar junction transistors (BJTs) 28, 30 which can overload the BJTs and damage them to a point where the circuit is useless. Diodes 32, 34 are present to help prevent reverse current flow through the BJTs.

As briefly stated previously, the ballast operates at a certain frequency or range of frequencies. The resonant frequency of the ballast, that is, the frequency at which the ballast yields optimal performance, is defined by a set of inductors 36, 38, 40 and the capacitor 35. During normal operation, the operating frequency is slightly above the resonant frequency determined by the capacitor 35 and the inductor 40. In the preferred embodiment, an AC switch is connected between points a and b. When activated, the AC switch creates a low impedance between points a and b, thereby bypassing the inductors 38 and 40, which help to define the resonant frequency of the ballast. When the AC switch begins conducting, it shunts most of the current away from the inductor 40. This reduces the ability of the capacitor 35 and inductor 40 to control the operating frequency and the oscillations cease, causing the current flow through transistors 28 and 30 to cease. Every two to three seconds, the switch opens again, introducing the inductors 38, 40 back into the ballast circuit. If the lamp 18 is not present or is not functioning, the switch conducts repeating the cycle until an operating lamp is present between contacts 24 and 26. Back to back Zener diodes 42 clamp the voltage across the inductor 40. This clamps the voltage between nodes 24 and 26 until the AC switch begins to conduct.

Figure 3:
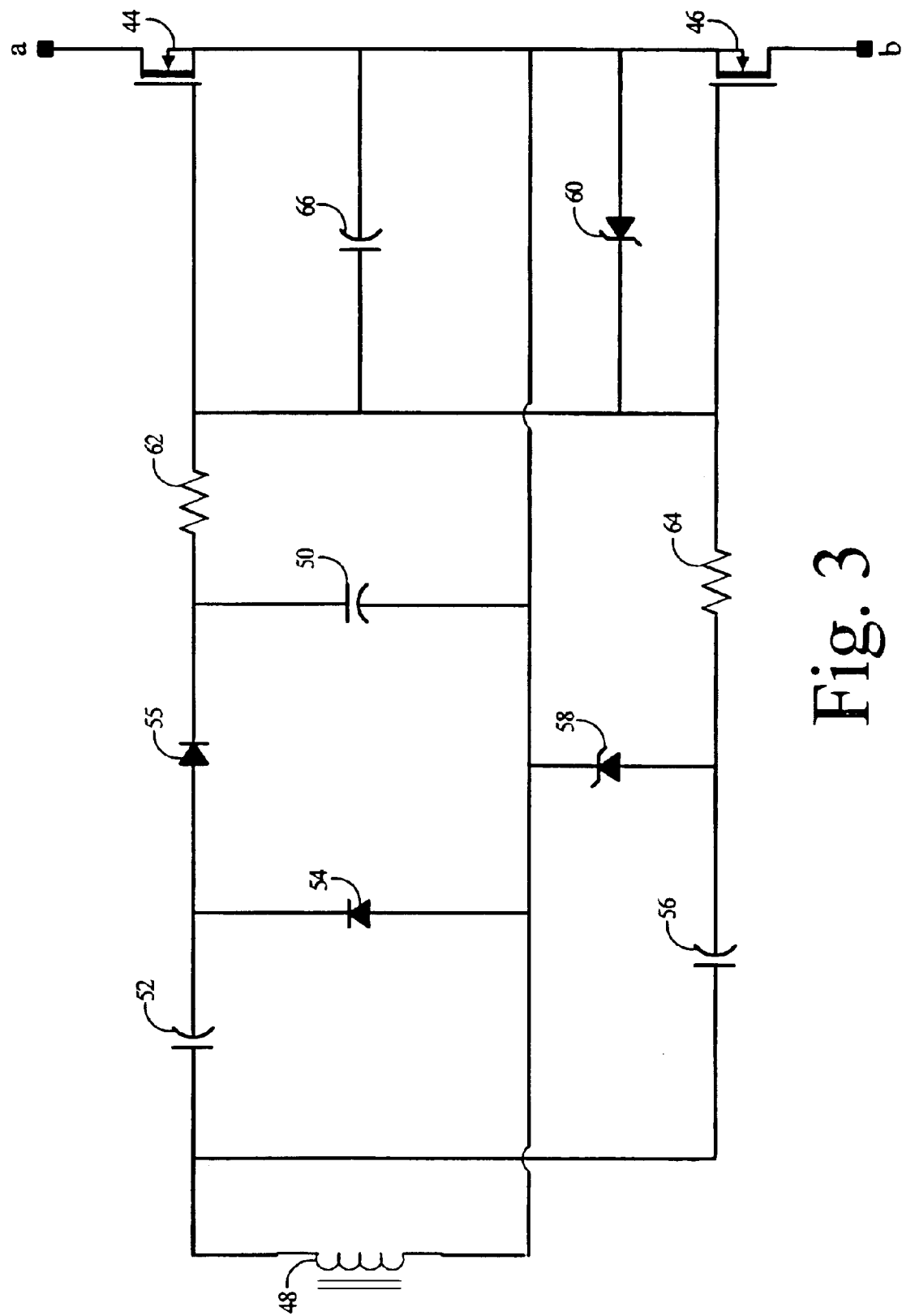
FIG. 3 is a circuit diagram of an alternating current switch incorporated into the ballast circuit, in accordance with an embodiment of the present invention.

With reference to FIG. 3 the AC switch includes a pair of metal oxide semi-conducting field effect transistors (MOSFETs) 44, 46. It is to be understood that other transistor types, such as IGFETs, JFETs, or BJTs, all of either the p or n junction variety can also be used. When turned conductive, the MOSFETs 44, 46 provide a current shunt away from the inductors 38, 40, that is, they provide a low impedance between points a and b. In order for the MOSFETs 44, 46 to turn conductive, a positive voltage must be applied to the gate of each MOSFET. It is to be understood that although n-channel MOSFETs are illustrated, the polarities of this circuit can be reversed to allow for p-channel devices as well. An inductive tap 48 provides voltage for the AC switch. The inductive tap 48 is a transformer winding in which voltage is induced by the inductor 36. There is a large voltage difference between the voltage across the inductor 36 when the lamp 18 is connected and when it is disconnected. Macroscopically, the AC switch senses the difference and activates, thereby protecting the ballast circuit.

During normal operation of the ballast circuit, i.e., when the lamp is engaged and functioning, the gates of the MOSFETs 44, 46, are reverse biased, rendering them non-conductive. The reverse bias is caused by the lower charge pump, comprising the capacitor 56 and Zener diode 58. Additionally, the upper charge pump comprises the capacitor 52, diode 54, diode 55, and capacitor 50 also operates, establishing a voltage across the capacitor 50. In one preferred embodiment, the reverse bias is approximately five volts with respect to the sources of the MOSFETs 44 and 46. The reverse bias is to ensure that the MOSFETs 44, 46 do not activate when the lamp 18 is operating normally. If the lamp is removed from the circuit, the voltage across the inductor 36 rises. Thus, the voltage produced by the inductive tap 48 likewise rises. This rise in voltage causes the voltage across the capacitor 50 to increase while the voltage produced across the diode 58 is clamped by the zenering function. Thus, the voltage across the capacitor 50 continues to rise while the voltage across diode 58 does not change. This action turns on the MOSFETs 44 and 46.

The upper charge pump includes a capacitor 50 that stores charge to overcome the reverse bias applied to the gates of the MOSFETs 44, 46. In one embodiment, this capacitor is a 1 μF capacitor. During one-half cycle of the inverter operating cycle, the inductive tap charges capacitor 52. During the next half cycle, the inductive tap 48 charges a second capacitor 50 of the first charge pump. Essentially, charge is transferred from capacitor 52 to capacitor 50. Since capacitor 52 is much smaller than capacitor 50, the rate at which capacitor 50 charges is controlled. The capacitor 52 may for example be a 47 nF capacitor. Smaller values will charge capacitor 50 at a slower rate, causing more of a delay to turn on MOSFETs 44 and 46. During the next half cycle, the inductive tap 48 once again charges the capacitor 52. The charging of capacitor 50 is repeated on the next half cycle. Thus, capacitor 50 continues to charge until MOSFETs 44 and 46 are turned on. Over several charging cycles, capacitor 50 accumulates sufficient charge to overcome the reverse bias on the gates. The voltage applied to the gates of the MOSFETs 44 and 46 is determined by the average voltage across Zener diode 58, the voltage across capacitor 50 and the voltage divider, comprising resistors 62 and 64. Since the voltage appearing across the winding 48 is a square wave. The average voltage across the Zener diode 58 will be ½ of its Zener value. For example, if the Zener voltage is 10 volts, the average voltage will be 5 volts. The voltage at the gates of the MOSFETs 44 and 46 is given by:

$$v_{gs} = \frac{v_{C50} \cdot R64 - v_B \cdot R62}{R64 + R62}$$

where $v_{gs}$ is the gate-source voltage of the MOSFETs 44 and 46, $v_{C50}$ is the voltage across the capacitor 50 and $v_B$ is the average voltage developed across the Zener diode 58, that is, the bias voltage.

$V_{gs}$ will increase until the threshold of MOSFETs 44 and 46 is reached. At this time, 44 and 46 begin to conduct, shunting current away from the inductors 38 and 40.

Once a forward bias is applied to the gates, that is, once the threshold voltage has been reached, the MOSFETS 44, 46 turn conductive. As previously discussed, this diverts current away from the inductors 38 and 40, causing inverter oscillations to cease. As a result, the voltage across the inductor 36 is reduced to zero, and consequently, the voltage induced in the winding 48 is reduced to zero. Thus, the negative bias is removed and the voltage developed across the capacitor 66 (also the gate-source voltage) rises. This means, although the capacitor 50 had to accumulate enough charge to overcome the threshold voltage, it has to discharge back to the threshold to render MOSFETs 44 and 46 non-conductive. Utilizing one set of component values, the capacitor 50 takes approximately 500 μs to charge to the threshold voltage, and approximately two to three seconds to discharge.

When MOSFETs 44, 46 again become non-conductive, the inverter re-initiates oscillations. If the lamp 18 is still not functional, the cycle repeats until the lamp 18 is replaced. If the lamp is functional, the ballast resumes steady state operation with the AC switch off.

In the time period when the capacitor 50 is charging, relatively high voltages and currents are present within the AC switch. To protect the MOSFETs, a Zener diode 60 clamps the voltage to a safe potential. Preferably, and with specific reference to FIG. 3, the resistor on the top rail 62 is nominally 510 kΩ and the resistor on the bottom rail 64 is 270 kΩ. Also included in the AC switch is a capacitor 66 that averages the voltage produced by the bias circuit. In the present embodiment, the capacitor 66 is a 1 nF capacitor.

Following is a list of exemplary components and component values for the preferred embodiment.

| BJT | 28 | 13003 |
|---|---|---|
| BJT | 30 | 93003 |
| Diode | 32 | 1N4937 |
| Diode | 34 | 1N4937 |
| Capacitor | 35 | 100 nanofarads |
| Inductor | 36 | 3.5 millihenries |
| Inductor | 38 | 350 millihenries |
| Inductor | 40 | 150 microhenries |
| Zener Diodes | 42 | 1N5240 |
| First MOSFET | 44 | IRLML2502 |
| Second MOSFET | 46 | IRLML6401 |
| Inductor | 48 | 3.5 millihenries |
| Capacitor | 50 | 1 microfarad |
| Capacitor | 52 | 47 nanofarads |
| Diode | 54 | 1N4148 |
| Diode | 55 | 1N4148 |

-continued

| Capacitor | 56 | 1 nanofarad |
| Zener Diode | 58 | 1N5240 |
| Resistor | 62 | 510 KΩ |
| Resistor | 64 | 270 KΩ |
| Capacitor | 66 | 1 nanofarad |

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A lighting system comprising:
   a power factor correction circuit for rectifying and smoothing a voltage signal from the alternating current source creating a direct current bus signal;
   a ballast powered by the direct current bus signal, the ballast including an alternating current switch, the AC switch including a first transistor and a second transistor, the first and second transistors forming a current shunt that draws current away from circuit components prone to damage by high currents, preventing damage to the ballast when a light source at least one of a) is removed from the ballast, and b) fails to arc.

2. The lighting system as set forth in claim 1, wherein the alternating current switch includes at least one Zener diode and at least one resistor for clamping voltage to the transistors.

3. The lighting system as set forth in claim 1, wherein the alternating current switch includes an inductor that provides sufficient voltage to the alternating current switch to overcome a threshold bias and activate the transistors.

4. The lighting system as set forth in claim 3, wherein the AC switch includes at least one capacitor that stores charge provided by the inductor, forcing a gate-source voltage of the transistors high enough to activate the transistors.

5. The lighting system as set forth in claim 4, wherein the at least one capacitor discharges turning the transistors non-conductive, forcing the ballast to attempt to ignite the light source.

6. A method of protecting a DC lighting ballast circuit from open circuit voltages comprising:
   creating an open circuit voltage on the ballast by removing a load from the circuit;
   activating an alternating current circuit switch which raises an operating frequency of the ballast, lowering voltage and current flow through the circuit; and
   shunting current away from circuit components prone to damage from excessive current by activating first and second transistors, the transistors being a portion of the AC circuit.

7. The method as set forth in claim 6, further including:
   reverse-biasing the transistors to hold the transistors non-conductive during normal operation of the ballast.

8. The method as set forth in claim 6, further including:
   clamping the voltage to the transistors with at least one Zener diode to prevent overload of the transistors due to excessive voltage.

9. The method as set forth in claim 6, further including:
   responding to a damaging rise in voltage by activating first and second transistors in the alternating current circuit.

10. The method as set forth in claim 9, further including:
    cyclically charging and discharging a capacitance.

11. The method as set forth in claim 10, further including:
    attempting to return current flow to the load each time the capacitance discharges.

12. An alternating current switch for use in conjunction with a lamp ballast, the switch comprising:
    first and second field effect transistors that when conductive, draw current away from the ballast;
    an inductive tap that supplies power to the alternating current switch and reverse-biases gates of the field effect transistors;
    first and second charge pumps which store charge from the inductive tap.

13. The alternating current switch as set forth in claim 12, wherein the first charge pump includes:
    a first capacitance that stores charge to overcome the reverse bias applied to the gates of the transistors;
    a second capacitance that helps to charge the first capacitance;
    first and second diodes that direct current flow to appropriately charge the first and second capacitances.

14. The alternating current switch as set forth in claim 13, wherein the first capacitance supplies a threshold voltage to the gates of the transistors, turning them conductive, causing the inductive tap to shut off, temporarily eliminating the reverse bias on the gates of the transistors, and the first capacitance discharges, no longer supplying the necessary threshold voltage turning the inductive tap on, re-applying the bias voltage to the gates, turning the transistors non-conductive and recharging the first and second capacitances.

15. The alternating current switch as set forth in claim 14, wherein the first capacitance has a discharge time of two to three seconds, during which time the reverse bias has been removed, at the end of which time the reverse bias is re-applied.

16. The alternating current switch as set forth in claim 15, further including:
    at least one Zener diode that prevents damaging voltages from reaching the gates of the transistors.

17. The alternating current switch as set forth in claim 15, further including:
    resistors that limit current applied to drains of the transistors.

* * * * *